(12) United States Patent
Massot

(10) Patent No.: US 9,771,167 B2
(45) Date of Patent: Sep. 26, 2017

(54) MONITOR SYSTEM FOR MONITORING THE STARTING OF A ROTARY WING AIRCRAFT, AN AIRCRAFT, AND A METHOD USING THE SYSTEM

(71) Applicant: AIRBUS HELICOPTERS, Marignane (FR)

(72) Inventor: Lucie Massot, Aix en Provence (FR)

(73) Assignee: Airbus Helicopters, Marignane (FR)

( * ) Notice: Subject to any disclaimer, the term of this patent is extended or adjusted under 35 U.S.C. 154(b) by 279 days.

(21) Appl. No.: 14/839,231

(22) Filed: Aug. 28, 2015

(65) Prior Publication Data

US 2015/0367951 A1 Dec. 24, 2015

Related U.S. Application Data

(63) Continuation-in-part of application No. 14/155,520, filed on Jan. 15, 2014, now abandoned.

(30) Foreign Application Priority Data

Jan. 16, 2013 (FR) ...................................... 13 00081

(51) Int. Cl.
*B64D 45/00* (2006.01)
*F02C 6/20* (2006.01)
(Continued)

(52) U.S. Cl.
CPC .............. *B64D 45/00* (2013.01); *B64C 27/14* (2013.01); *F02C 6/206* (2013.01); *F02C 7/26* (2013.01); *F02C 9/00* (2013.01); *F05D 2220/329* (2013.01); *F05D 2260/80* (2013.01); *F05D 2260/85* (2013.01)

(58) Field of Classification Search
None
See application file for complete search history.

(56) References Cited

U.S. PATENT DOCUMENTS 2,912,822 A * 11/1959 Hooker .................. F01D 21/02
60/39.091
4,231,092 A 10/1980 Grob et al.
(Continued)

FOREIGN PATENT DOCUMENTS

GB 2193535 2/1988
JP 2007270770 10/2007

OTHER PUBLICATIONS

Sikorsky Aircraft, Helicopter Freewheel Unit Design Guide, Sikorsky Aircraft, Oct. 1977, pp. 3-24 of 239, http://www.dtic.mil/dtic/tr/fulltext/u2/a047559.pdf.*
(Continued)

*Primary Examiner* — John R Olszewski
*Assistant Examiner* — David Merlino
(74) *Attorney, Agent, or Firm* — Brooks Kushman P.C.

(57) ABSTRACT

A method of starting a turboshaft engine (5) of an aircraft (1), said aircraft (1) being provided with a rotary wing, said aircraft (1) having a freewheel (15) interposed in a drive train (10) between said engine (5) and a rotor (2) of said rotary wing (1), said engine (5) comprising a gas generator (6) and a free turbine (9), the drive train (10) including an upstream portion (11) connecting said free turbine (9) to said freewheel (15), the method comprising the following steps: measuring the torque (Tq) exerted on said upstream portion (11), and measuring a speed of rotation (Ng) of said gas generator (6); comparing said torque (Tq) with a torque threshold (Stq) and comparing said speed of rotation (Ng) with a gas generator speed threshold (Sng); and stopping said engine (5) when said torque (Tq) is less than the torque threshold (Stq) and when said speed of rotation (Ng) is greater than the gas generator speed threshold (Sng).

3 Claims, 1 Drawing Sheet

(51) Int. Cl.
 *F02C 7/26* (2006.01)
 *F02C 9/00* (2006.01)
 *B64C 27/14* (2006.01)

(56) References Cited

U.S. PATENT DOCUMENTS

| | | | | |
|---|---|---|---|---|
| 4,411,595 A | * | 10/1983 | Pisano | F02C 9/28 |
| | | | | 416/1 |
| 4,454,754 A | * | 6/1984 | Zagranski | F01D 21/14 |
| | | | | 701/100 |
| 4,500,966 A | * | 2/1985 | Zagranski | B64C 27/006 |
| | | | | 701/100 |
| 5,046,923 A | * | 9/1991 | Parsons | B64C 27/57 |
| | | | | 60/39.281 |
| 5,363,317 A | * | 11/1994 | Rice | B64D 31/12 |
| | | | | 701/31.7 |
| 5,799,748 A | | 9/1998 | Origuchi | |
| 6,282,882 B1 | * | 9/2001 | Dudd, Jr. | F02C 7/26 |
| | | | | 60/39.281 |
| 2002/0005455 A1 | * | 1/2002 | Carter, Jr. | B64C 27/02 |
| | | | | 244/8 |
| 2005/0278084 A1 | | 12/2005 | Certain | |
| 2008/0101917 A1 | * | 5/2008 | Bart | F01D 21/006 |
| | | | | 415/9 |
| 2013/0098042 A1 | * | 4/2013 | Frealle | F02C 9/28 |
| | | | | 60/734 |
| 2013/0247577 A1 | * | 9/2013 | Rossotto | F02C 9/00 |
| | | | | 60/773 |
| 2016/0298486 A1 | * | 10/2016 | Langford | F02C 9/46 |

OTHER PUBLICATIONS

French Search Report for FR 1300081, Completed by the French Patent Office dated Oct. 25, 2013, 7 Pages.
Office Action dated May 28, 2015, U.S. Appl. No. 14/155,520, filed Jan. 15, 2014, 13 Pages.

* cited by examiner

MONITOR SYSTEM FOR MONITORING THE STARTING OF A ROTARY WING AIRCRAFT, AN AIRCRAFT, AND A METHOD USING THE SYSTEM

CROSS-REFERENCE TO RELATED APPLICATIONS

This application is a continuation-in-part of U.S. application Ser. No. 14/155,520 filed Jan. 15, 2014, which, in turn, claims the benefit of FR 13 00081 filed on Jan. 16, 2013, the disclosures of which are incorporated in their entirety by reference herein.

BACKGROUND OF THE INVENTION (1) Field of the Invention

The present invention relates to a monitor system for monitoring the starting of a rotary wing aircraft. The invention also relates to a rotary wing aircraft fitted with such a system and to a method of starting a turboshaft engine that make use of the monitor system.

The invention thus lies in the field of devices for monitoring the power plant of rotary wing aircraft.

(2) Description of Related Art

Conventionally, a rotary wing aircraft has a power plant provided with a rotor that provides at least some of the lift of the aircraft. The rotor may also contribute to providing at least some of the propulsion of the aircraft. Thus, a helicopter has a main rotor that provides it both with lift and with propulsion.

The rotor is driven in rotation by a main gearbox that is driven by at least one engine.

For example, the power plant includes a turboshaft engine having a gas generator and a free turbine for delivering power. The free turbine is then linked to the main gearbox by a drive train for transmitting power.

The drive train for transmitting power is usually fitted with an overrunning clutch or "freewheel". The freewheel has a driving portion that is driven in rotation by an engine, and a driven portion that is connected to the main gearbox.

Such a freewheel has the function of enabling the rotor to be driven by the engine while, in contrast, preventing the engine being driven by the drive train. The freewheel may be advantageous in particular during a stage of autorotation of the rotary wing, for example.

Such a freewheel can become degraded while it is in use. Under such circumstances, a degraded freewheel can slip, constituting a location where mechanical slip takes place between two components.

For example, the freewheel may have rollers interposed between the driving portion and the driven portion. The rollers then allow the driven portion to be driven by the driving portion. Nevertheless, the rollers may become eroded and they might no longer perform their function correctly.

When starting the engine, a worn freewheel can lead to mechanical rupture of the power drive train. If the driving portion of the freewheel no longer drives the driven portion, then the engine runs the risk of having its free turbine in an overspeed situation. If mechanical transmission between the driving portion and the driven portion is erratic, then the engine can be subjected to mechanical jolting in the event of the driving and driven portions suddenly re-engaging.

Slip in the freewheel can also lead to abnormal wear of mechanical elements present between the engine and the rotor of the rotary wing, e.g. as a result of repeated jolting.

Consequently, when starting the engine(s) of an aircraft, a pilot tends to perform visual verification that the rotor is being driven in rotation. If the rotor is set into rotation, then the pilot can deduce that the drive train is operating correctly.

The flight manual of an aircraft may require the pilot to verify visually that the rotor is rotating as from a threshold speed of rotation of the engine.

If the rotor is not set into rotation, the pilot then stops the engine.

The remote technological background in the field of the invention includes the following documents: U.S. Pat. No. 4,231,092 A, U.S. Pat. No. 5,799,748 A, and JP 2007 270 770 A.

Document U.S. Pat. No. 4,231,092 A proposes to replace an automatic transmission system having a clutch. A freewheel effect is simulated by a microprocessor. Slip is detected when the torque upstream from the clutch is negative.

Document U.S. Pat. No. 5,799,748 A describes means for detecting the current state of a freewheel system. That document does not describe the specific circumstance of the freewheel slipping and it is directly entirely to the remote automobile field.

Document JP 2007 270 770 A suggests measuring the speed of rotation of the rotor in order to detect slip of a freewheel.

Also known are the following documents: U.S. Pat. No. 5,046,923, GB 2 193 535, and US 2005/278084.

BRIEF SUMMARY OF THE INVENTION

An object of the present invention is thus to propose an aircraft system for automatically monitoring the starting of a rotary wing aircraft, where such starting might be hindered by slip in a freewheel of a power plant, the freewheel being interposed between an engine and a rotor for providing the aircraft with lift and possibly also propulsion.

Thus, the invention provides a monitor system for monitoring the starting of a rotary wing aircraft, the aircraft having a freewheel interposed in a drive train for transmitting power between a turboshaft engine and a rotor of the rotary wing, the engine comprising a gas generator and a free turbine. The drive train includes an upstream portion connecting the free turbine to the freewheel.

The monitor system is remarkable in particular in that it comprises a first measurement device for measuring, when mounted, the torque exerted on the upstream portion, and a second measurement device for measuring, when mounted, a speed of rotation of said gas generator, and a third measurement device for measuring, when mounted, a speed of rotation of said rotor. The monitor system then possesses a processor unit connected, when mounted, to the engine and also to the first measurement device and to the second measurement device and to the third measurement device. The processor unit is configured in such a manner that the processor unit automatically stops starting of the engine when the torque is less than a torque threshold and when said speed of rotation of the gas generator is greater than a speed threshold and when said speed of rotation of the rotor is lower than a rotor speed threshold.

The monitor system may thus also be thought of as a "system for detecting slip of a freewheel in a power plant" insofar as the system can interrupt starting the engine on detecting such slip.

Under such circumstances, the monitor system is an automatic system that verifies that the rotor of the rotary wing is indeed set into rotation. If it is not, the speed of rotation of the gas generator increases. Above a gas generator speed threshold for the speed of rotation of the gas generator, if the torque exerted on the upstream portion has not reached the torque threshold and if the speed of rotation of the rotor is lower than a rotor speed threshold, then the processor unit deduces the presence of a malfunction, such as slip in said freewheel. The processor unit then requires the starting of the engine to be stopped.

Consequently, the work load on the pilot can be reduced, since the pilot is no longer obliged to monitor the operation of the rotor.

If the freewheel slips on starting rotation of the rotor, starting can be interrupted in order to avoid damaging other mechanical elements and in order to avoid an incident in flight.

Furthermore, the monitor system presents the advantage of being easy to arrange. The first measurement device, the second measurement and the third measurement device may be of conventional type. For example, the first measurement device may be a torque-meter shaft arranged in a power shaft secured to the free turbine.

The term "torque-meter shaft" is used to mean a shaft having a torque meter.

The processor unit may also be incorporated in an electronic system for controlling an engine, sometimes known as a full authority digital engine control (FADEC) system.

The information can thus be processed quickly, since the information transmission channel is short and robust.

In addition to a monitor system, the invention also provides an aircraft having a rotary wing and at least one turboshaft engine, the aircraft having a freewheel interposed in a drive train for transmitting power between the engine and a rotor of the rotary wing, the engine comprising a gas generator and a free turbine, the drive train including an upstream portion connecting the free turbine to the freewheel.

The aircraft is then provided with a monitor system of the above-described type. Moreover, the rotor rotating at at least one predetermined nominal speed, said rotor speed threshold can be lower than the lowest nominal speed.

The invention also provides a method of starting a turboshaft engine of an aircraft implementing the monitor system, the aircraft being provided with a rotary wing, and with a freewheel interposed in a drive train for transmitting power between said engine and a rotor of said rotary wing, the engine comprising a gas generator and a free turbine, the drive train including an upstream portion connecting said free turbine to said freewheel. The method comprises the following steps:

measuring the torque exerted on the upstream portion with a first measurement device, and measuring a speed of rotation of said gas generator with a second measurement device, and measuring a speed of rotation of said rotor;

using a processor unit to compare said torque with a torque threshold, to compare said speed of rotation of the gas generator with a gas generator speed threshold, and to compare said speed of rotation of the rotor with a rotor threshold; and stopping the starting of said engine when said torque is less than the torque threshold and said speed of rotation of the gas generator is greater than a speed threshold and when said speed of rotation of the rotor is lower than the rotor speed threshold.

The manufacturer can determine suitable speed and torque thresholds by testing or by calculation.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which.

Elements that are present in more than one of the figures are given the same references in each of them.

DETAILED DESCRIPTION OF THE INVENTION

Figure 1:
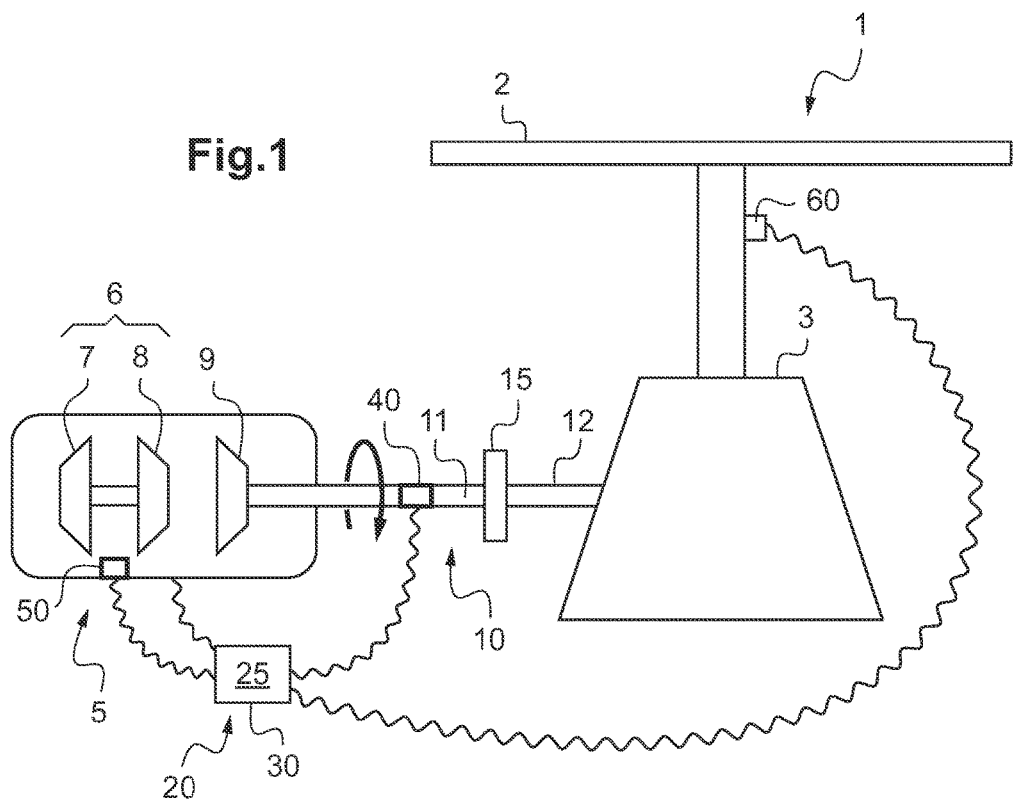
FIG. 1 is a diagram showing an aircraft of the invention.

FIG. 1 shows an aircraft 1 of the invention.

The aircraft 1 includes a rotary wing having at least one rotor 2.

In order to set the rotary wing into rotation, the aircraft 1 has at least one turboshaft engine 5 and a main gearbox 3. The engine 5 then drives the main gearbox 3 via a drive train 10 for transmitting power, the main gearbox 3 than setting the rotor 2 in rotation.

The engine 5 has a gas generator 6. The gas generator 6 is conventionally provided with a compressor 7 associated with a high pressure turbine 8.

The engine 5 also has a free turbine 9. The gas coming from the gas generator 6 serves to set the free turbine 9 into rotation.

Consequently, the drive train 10 for transmitting power includes at least one shaft connecting the free turbine 9 to the main gearbox 3. This drive train 10 for transmitting power also possesses a freewheel 15.

Thus, the drive train 10 has an upstream portion 11 connecting the free turbine 9 to a driving portion of the freewheel 15. The drive train 10 also has a downstream portion 12 connecting a driven portion of the freewheel 15 to the main gearbox 3. Each portion may thus have at least one power transmission shaft.

The aircraft 1 is then provided with a monitor system 20 for monitoring the installation when starting the engine 5.

The monitor system 20 has a first measurement device 40 for determining the torque exerted by the engine 5 on the upstream portion 11. This first measurement device 40 may comprise a torque-meter shaft.

In addition, the monitoring system 20 has a second measurement device 50 for determining the speed of rotation Ng of the gas generator 6, i.e. the speed of rotation of the compressor 7 and/or of the high pressure turbine 8, for example.

This second measurement device 50 may be of conventional type.

In addition, the monitoring system 20 has a third measurement device 60 for determining the speed of rotation Nr of the rotor 2. This speed of rotation of the rotor 2 can be evaluated by measuring for example the speed of rotation of the mast of the rotor, or of a mobile part of main gearbox 3, or of a part of the drive train 10. This third measurement device 60 may be of conventional type.

Under such circumstances, the monitor system 20 has a processor unit 25 communicating with the first measurement device 40, the second measurement device 50 and the third measurement device 60.

The processor unit may comprise a member that executes stored instructions in order to apply the method being implemented. The processor unit may thus possess a processor or the equivalent and a non-volatile memory.

This processor unit may be a FADEC system for controlling the engine. In a variant, the processor unit may be remote and may communicate with any system suitable for stopping the engine in order to be able to transmit an order thereto for stopping the engine.

Figure 2:
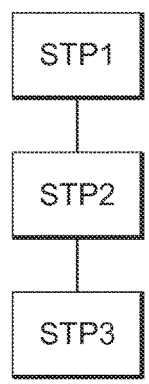
FIG. 2 is a diagram explaining the method of the invention.

Under such circumstances, and with reference to FIG. 2, during a measurement step STP1 the following are measured continuously:

the torque Tq exerted on the upstream portion 11 as measured by the first measurement device 40; and the speed of rotation Ng of the gas generator 6 as measured by the second measurement device 50, and the speed of rotation Nr of said rotor 2 as measured by the third measurement device 60.

During an evaluation step STP2, the processor unit 25 continuously compares the torque Tq with a torque threshold Stq and compares the speed of rotation Ng of the gas generator 6 with a gas generator speed threshold Sng, and compares the speed of rotation Nr of the rotor 2 with a rotor speed threshold.

During a turn-off step STP3, the processor unit 25 requests stopping of the engine 5 when the following three conditions are satisfied simultaneously:

the torque Tq is less than the torque threshold Stq; and the speed of rotation Ng of the gas generator 6 is greater than the gas generator speed threshold Sng, and the speed of rotation Nr of the rotor 2 is lower than the rotor speed threshold.

Naturally, the present invention may be subjected to numerous variations as to its implementation. Although several embodiments are described, it will readily be understood that it is not conceivable to identify exhaustively all possible embodiments. It is naturally possible to envisage replacing any of the means described with equivalent means without going beyond the ambit of the present invention.

In particular, the invention may be performed on an aircraft having a plurality of turboshaft engines.

What is claimed is:

1. A monitor system for monitoring the starting of a rotary wing aircraft, the aircraft having a rotary wing including a rotor, a turboshaft engine having a gas generator and a free turbine, a drive train for transmitting power between the turboshaft engine and the rotor, and a freewheel interposed in the drive train, the freewheel including a driving portion and a driven portion, and the drive train including an upstream portion connecting the free turbine to the driving portion of the freewheel and a downstream portion connecting the driven portion of the freewheel to the rotor via a gearbox, the monitor system comprising:

a first measurement device for measuring a torque (Tq) exerted on the upstream portion of the drive train connecting the free turbine of the turboshaft engine to the driving portion of the freewheel;

a second measurement device for measuring a speed of rotation (Ng) of the gas generator;

a third measurement device for measuring a speed of rotation (Nr) of the rotor; and a processor configured to compare the torque (Tq) with a torque threshold (Stq), the speed of rotation (Ng) of the gas generator with a gas generator speed threshold (Sng), and the speed of rotation (Nr) of the rotor with a rotor speed threshold; and automatically stop starting of the turboshaft engine when simultaneously the torque (Tq) is less than the torque threshold (Stq) as determined by the processor from the processor comparing the torque (Tq) with the torque threshold (Stq), the speed of rotation (Ng) of the gas generator is greater than the gas generator speed threshold (Sng) as determined by the processor from the processor comparing the speed of rotation (Ng) of the gas generator with the gas generator speed threshold (Sng), and the speed of rotation (Nr) of the rotor is lower than the rotor speed threshold as determined by the processor from the processor comparing the speed of rotation (Nr) of the rotor with the rotor speed threshold.

2. An aircraft comprising:

a rotary wing having a rotor;

a turboshaft engine having a gas generator and a free turbine;

a drive train for transmitting power between the turboshaft engine and the rotor;

a freewheel interposed in the drive train, the freewheel including a driving portion and a driven portion;

the drive train including an upstream portion connecting the free turbine to the driving portion of the freewheel and a downstream portion connecting the driven portion of the freewheel to the rotor via a gearbox; and a monitor system for monitoring the starting of the aircraft, the monitor system including a first measurement device for measuring a torque (Tq) exerted on the upstream portion of the drive train connecting the free turbine of the turboshaft engine to the driving portion of the freewheel, a second measurement device for measuring a speed of rotation (Ng) of the gas generator, a third measurement device for measuring a speed of rotation (Nr) of the rotor, and a processor configured to compare the torque (Tq) with a torque threshold (Stq), the speed of rotation (Ng) of the gas generator with a gas generator speed threshold (Sng), and the speed of rotation (Nr) of the rotor with a rotor speed threshold; and automatically stop starting of the turboshaft engine when simultaneously the torque (Tq) is less than the torque threshold (Stq) as determined by the processor from the processor comparing the torque (Tq) with the torque threshold (Stq), the speed of rotation (Ng) of the gas generator is greater than the gas generator speed threshold (Sng) as determined by the processor from the processor comparing the speed of rotation (Ng) of the gas generator with the gas generator speed threshold (Sng), and the speed of rotation (Nr) of the rotor is lower than the rotor speed threshold as determined by the processor from the processor comparing the speed of rotation (Nr) of the rotor with the rotor speed threshold.

3. A method of starting a rotary wing aircraft, the aircraft having a rotary wing having a rotor, a turboshaft engine having a gas generator and a free turbine, a drive train for transmitting power between the turboshaft engine and the rotor, and a freewheel interposed in the drive train, the freewheel including a driving portion and a driven portion, and the drive train including an upstream portion connecting the free turbine to the driving portion of the freewheel and a downstream portion connecting the driven portion of the freewheel to the rotor via a gearbox, the method comprising:

measuring a torque (Tq) exerted on the upstream portion of the drive train connecting the free turbine of the turboshaft engine to the driving portion of the freewheel with a first measurement device;

measuring a speed of rotation (Ng) of the gas generator with a second measurement device;

measuring a speed of rotation (Nr) of the rotor with a third measurement device;

comparing, by a processor, the torque (Tq) with a torque threshold (Stq), the speed of rotation (Ng) of the gas generator with a gas generator speed threshold (Sng), and the speed of rotation (Nr) of the rotor with a rotor speed threshold; and stopping, by the processor, the starting of the engine when simultaneously the torque (Tq) is less than the torque threshold (Stq) as determined by the processor from the processor comparing the torque (Tq) with the torque threshold (Stq), the speed of rotation (Ng) of the gas generator is greater than the gas generator speed threshold (Sng) as determined by the processor from the processor comparing the speed of rotation (Ng) of the gas generator with the gas generator speed threshold (Sng), and the speed of rotation (Nr) of the rotor is lower than the rotor speed threshold as determined by the processor from the processor comparing the speed of rotation (Nr) of the rotor with the rotor speed threshold.

* * * * *